(12) United States Patent
Takahashi et al.

(10) Patent No.: US 8,229,171 B2
(45) Date of Patent: Jul. 24, 2012

(54) APPARATUS, METHOD, AND COMPUTER PRODUCT FOR VEHICLE-TYPE DETERMINATION USING IMAGE DATA OF VEHICLE

(75) Inventors: Kunikazu Takahashi, Kawasaki (JP); Kenji Kodama, Oita (JP); Atsuyoshi Ando, Oita (JP); Takako Shinjo, Oita (JP); Sahoko Hata, Oita (JP)

(73) Assignee: Fujitsu Limited, Kawasaki (JP)

( * ) Notice: Subject to any disclaimer, the term of this patent is extended or adjusted under 35 U.S.C. 154(b) by 776 days.

(21) Appl. No.: 12/292,119

(22) Filed: Nov. 12, 2008

(65) Prior Publication Data

US 2009/0074250 A1   Mar. 19, 2009

Related U.S. Application Data

(63) Continuation of application No. PCT/JP2007/060733, filed on May 25, 2007.

(30) Foreign Application Priority Data

May 26, 2006   (JP) .................................. 2006-146775

(51) Int. Cl.
*G06K 9/00* (2006.01)
(52) U.S. Cl. ........................................ 382/104
(58) Field of Classification Search .................. None
See application file for complete search history.

(56) References Cited

U.S. PATENT DOCUMENTS

| 5,886,648 | A | 3/1999 | McElroy et al. | |
|---|---|---|---|---|
| 2005/0267657 | A1* | 12/2005 | Devdhar | 701/35 |
| 2006/0250279 | A1* | 11/2006 | Taniguchi et al. | 340/933 |
| 2007/0205938 | A1* | 9/2007 | Zimmermann et al. | 342/69 |

FOREIGN PATENT DOCUMENTS

| JP | 05-314389 | 11/1993 |
|---|---|---|
| JP | 5-314389 | 11/1993 |
| JP | 11-259792 | 9/1999 |
| JP | 11-353581 | 12/1999 |
| JP | 2000-222673 | 8/2000 |
| JP | 2003-331384 | 11/2003 |

OTHER PUBLICATIONS

Lai et al., "Vehicle type classification from visual-based dimension estimation", Intelligent Transportation Systems, 2001. Proceedings. 2001 IEEE, pp. 201-206, Aug. 25-29, 2001, Oakland, CA, USA. Print ISBN: 0-7803-7194-1. Digital Object Identifier: 10.1109/ITSC. 2001.948656.*

(Continued)

*Primary Examiner* — Bhavesh Mehta
*Assistant Examiner* — Tahmina Ansari
(74) *Attorney, Agent, or Firm* — Staas & Halsey LLP

(57) ABSTRACT

A vehicle-type determination apparatus includes a vehicle-portion extracting unit, a hood recognizing unit, and a vehicle-type determining unit. The vehicle-portion extracting unit extracts a vehicle portion from an image of a recognition object. The hood recognizing unit recognizes an area corresponding to a hood in the vehicle portion extracted by the vehicle-portion extracting unit. The vehicle-type determining unit determines the vehicle type based on the degree of inclination of a side of the hood area recognized by the hood recognizing unit.

8 Claims, 21 Drawing Sheets

OTHER PUBLICATIONS

Lai et al. "Vehicle-type identification through automated virtual loop assignment and block-based direction-biased motion estimation", Intelligent Transportation Systems, IEEE Transactions on Jun. 2000, vol. 1 Issue:2 pp. 86-97, ISSN: 1524-9050, Digital Object Identifier: 10.1109/6979.880965.*

Extended European Search Report for corresponding European Application 07744167.3-2218; dated Jan. 25, 2010.

Arai, Y. et al., "Fuzzy Hierarchical Car-model Pattern Recognition System Using Fixation Feedback"; 1997 First International Conference on Knowledge-Based Intelligent Electronic Systems, 21-23; pp. 154-158.

Yiguang Liu et al., "Vehicle Detection with Projection Histogram and Type Recognition Using Hybrid Neutral Networks"; Proceedings of 2007 IEEE, International Conference on Networking, Sensing & Control Taipei Taiwan, Mar. 21-23, 2004; pp. 315-335.

Setchell C. et al., "Vision-based road-traffic monitoring sensor", IEEE proceedings: Vision, Image and Signal Processing, Institution of Electrical Engineers, vol. 148, No. 1; Feb. 21, 2001, pp. 78-84.

Ferryman, J.M., "Visual surveillance using deformable models of vehicles", Robotics and Autonomous Systems 19 (1997) 315-335, vol. 19, No. 3-4, Mar. 1, 1997, pp. 315-335.

Chinese Office Action for corresponding Chinese Application 200780019343.0; issued Feb. 5, 2010.

International Search Report for PCT/JP2007/060733, mailed Jun. 26, 2007.

* cited by examiner

FIG.10

| INCLINATION OF HOOD (θ) | VEHICLE TYPE |
|---|---|
| 45° TO 75° | STANDARD-SIZED VEHICLE |
| 75° TO 85° | VAN |
| 85° TO 105° | LARGE-SIZED VEHICLE |

FIG.13

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 1 | 2 | 0 | 0 | 0 | 1 | 2 | 2 | 1 | 153 |
| 0 | 1 | 0 | 2 | 1 | 4 | 15 | 3 | 3 | 10 | 12 | 1 | 119 |
| 0 | 8 | 194 | 230 | 239 | 234 | 235 | 222 | 233 | 228 | 40 | 142 | 107 |
| 0 | 0 | 236 | 234 | 225 | 230 | 224 | 243 | 229 | 228 | 219 | 102 | 125 |
| 0 | 0 | 230 | 234 | 230 | 226 | 230 | 230 | 230 | 230 | 231 | 35 | 128 |
| 0 | 2 | 236 | 229 | 233 | 231 | 229 | 229 | 229 | 229 | 227 | 58 | 133 |
| 0 | 6 | 217 | 227 | 241 | 225 | 230 | 230 | 230 | 230 | 231 | 138 | 120 |
| 0 | 0 | 160 | 225 | 218 | 231 | 229 | 229 | 229 | 229 | 231 | 159 | 83 |
| 0 | 0 | 0 | 18 | 178 | 179 | 201 | 233 | 222 | 221 | 235 | 100 | 157 |
| 0 | 0 | 3 | 3 | 0 | 36 | 100 | 119 | 81 | 73 | 72 | 31 | 247 |
| 0 | 0 | 3 | 5 | 4 | 0 | 0 | 1 | 4 | 0 | 8 | 31 | 231 |
| 0 | 0 | 0 | 20 | 3 | 13 | 0 | 0 | 9 | 0 | 0 | 207 | 230 |
| 0 | 0 | 0 | 0 | 0 | 0 | 0 | 0 | 0 | 12 | 2 | 239 | 250 |
| 0 | 0 | 0 | 0 | 0 | 0 | 0 | 0 | 0 | 8 | 33 | 222 | 230 |

FIG.14

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 255 |
| 0 | 0 | 0 | 0 | 0 | 0 | 0 | 0 | 0 | 0 | 0 | 255 | 255 |
| 0 | 255 | 255 | 255 | 255 | 255 | 255 | 255 | 255 | 255 | 255 | 255 | 0 |
| 0 | 255 | 255 | 255 | 255 | 255 | 255 | 255 | 255 | 255 | 255 | 255 | 0 |
| 0 | 255 | 255 | 0 | 0 | 0 | 0 | 0 | 0 | 255 | 255 | 0 | 0 |
| 0 | 255 | 255 | 0 | 0 | 0 | 0 | 0 | 0 | 0 | 255 | 255 | 0 |
| 0 | 255 | 255 | 0 | 0 | 0 | 0 | 0 | 0 | 0 | 255 | 255 | 255 |
| 0 | 255 | 255 | 0 | 0 | 0 | 0 | 0 | 0 | 0 | 255 | 255 | 255 |
| 0 | 255 | 255 | 255 | 255 | 0 | 0 | 0 | 0 | 0 | 255 | 255 | 255 |
| 0 | 0 | 255 | 255 | 255 | 255 | 255 | 255 | 255 | 255 | 255 | 0 | 255 |
| 0 | 0 | 0 | 255 | 255 | 255 | 255 | 255 | 255 | 255 | 255 | 255 | 255 |
| 0 | 0 | 0 | 0 | 0 | 0 | 0 | 255 | 255 | 0 | 0 | 255 | 255 |
| 0 | 0 | 0 | 0 | 0 | 0 | 0 | 0 | 0 | 0 | 255 | 255 | 0 |
| 0 | 0 | 0 | 0 | 0 | 0 | 0 | 0 | 0 | 0 | 255 | 255 | 255 |
| 0 | 0 | 0 | 0 | 0 | 0 | 0 | 0 | 0 | 255 | 255 | 255 | 255 |

WIDTH W

| LINE A | LINE B | LINE C |
|---|---|---|
| (146, 6) | (190, 17) | (216, 16) |
| (146, 12) | (190, 37) | (216, 35) |
| (146, 36) | (190, 87) | (216, 77) |
| . . . | . . . | . . . |
| (146, 142) | (190, 136) | (216, 140) |

FIG.19

| (95, 37) |
|:---:|
| (94, 38) |
| (93, 39) |
| (93, 40) |
| (92, 41) |
| (92, 42) |
| . . . |
| (81, 82) |

FIG.20

| COLOR | | DEGREE OF ACCURACY |
|---|---|---|
| UPPER AREA | LOWER AREA | |
| SILVER | WHITE | 30 |
| WHITE | SILVER | 0 |
| . . . | . . . | . . . |

FIG.21

| HEIGHT | | DEGREE OF ACCURACY |
|---|---|---|
| UPPER AREA | LOWER AREA | |
| 25% | 40% | 40 |
| 30% | 20% | 0 |
| . . . | . . . | . . . |

APPARATUS, METHOD, AND COMPUTER PRODUCT FOR VEHICLE-TYPE DETERMINATION USING IMAGE DATA OF VEHICLE

CROSS REFERENCE TO RELATED APPLICATIONS

This is a continuing application, filed under 35 U.S.C. §111(a), of International Application PCT/JP2007/060733, filed May 25, 2007, and Japanese Application No. 2006-146775 filed May 26, 2006 in Japan, the contents of which are incorporated herein by reference.

BACKGROUND OF THE INVENTION

1. Field of the Invention

The embodiments discussed herein are directed to a technology for determining the type of a vehicle.

2. Description of the Related Art

A system has been used in vehicle control tasks, etc. that analyzes an image of a vehicle captured by an image capture device installed on the road to determine the type of the vehicle. Typically, a known system analyzes a license plate portion in an image to determine the vehicle type. For example, Japanese Patent Application Laid-open No. 2003-331384 discloses such a system that determines the vehicle type by using not only the license plate number on the license plate but also the color of the license plate and others In the license plate analysis, however, the vehicle type cannot be accurately determined when, for example, the license plate is dirty. Thus, if it is required to accurately determine the vehicle type under various conditions, a plurality of measures are combined to determine the vehicle type. For example, Japanese Patent Application Laid-open No. 2003-331384 discloses such a conventional technology for determining the vehicle type without depending on analysis of the license plate portion.

In this conventional technology, a hood portion and a windshield portion of a vehicle in an image are identified according to a predetermined rule and, based on the width and height of these portions, the type of the vehicle is determined as a standard-sized vehicle or a large-sized vehicle.

However, since the vehicle type is determined by the heights of the hood portion and the windshield portion and others, the vehicle type may be erroneously determined depending on the combination of the shape of the vehicle and the angle of an image capture device installed on the road.

In general, the height of the hood portion of a standard-sized vehicle in an image is lower as the image capture device is arranged at an angle closer to the horizontal and is higher as the angle is closer to the vertical. Therefore, depending on the angle of the image capture device, an image of the hood portion of a standard-sized vehicle of a specific type is captured with its height being approximately equal to the height of the hood portion of a large-sized vehicle, and the standard-sized vehicle may be erroneously determined as a large-sized vehicle. Since vehicles have its own characteristic shape depending on the type, it is difficult to completely prevent such an erroneous determination even if the angle of the image capture device is adjusted.

SUMMARY

It is an object of the present invention to at least partially solve the problems in the conventional technology.

According to an aspect of the present invention, there is provided a vehicle-type determination apparatus that determines a type of a vehicle based on an image of the vehicle captured. The vehicle-type determination apparatus includes: a unit that extracts, from the image, a horizontal straight line and a side straight line forming a contour of a vehicle-type determination area of the vehicle; a unit that obtains an angle between the horizontal straight line and the side straight line; and a vehicle-type determining unit that determines the type of the vehicle based on the angle.

According to another aspect of the present invention, there is provided a vehicle-type determination method for determining a type of a vehicle based on an image of the vehicle captured, including: extracting, from the image, a horizontal straight line and a side straight line forming a contour of a vehicle-type determination area of the vehicle; obtaining an angle between the horizontal straight line and the side straight line; and determining the type of the vehicle based on the angle.

According to still another aspect of the present invention, there is provided a computer-readable recording medium that stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a diagram of one example of a vehicle-type determination rule;

FIG. 13 is a table of pixel values of pixels forming an area A in FIG. 11;

FIG. 14 is a table of pixel values of pixels forming the area A in FIG. 12;

FIG. 19 is a table of coordinates of a side of an area corresponding to the hood;

FIG. 20 is a diagram of one example of a hood-area estimation rule by color;

FIG. 21 is a diagram of one example of the hood-area estimation rule by height of each area;

DETAILED DESCRIPTION OF THE PREFERRED EMBODIMENTS

Exemplary embodiments of the present invention are described in detail below with reference to the accompanying drawings.

Described below is the general outline of a vehicle-type determination method of an embodiment. According to the vehicle-type determination method of the embodiment, a vehicle portion of an object to be recognized, i.e., recognition object, is extracted from a recognized image, and the vehicle type is roughly determined based on the height and inclination of a hood portion (vehicle-type determination area) of the extracted vehicle portion. By using not only the height of the hood portion but also the inclination thereof for determination, the vehicle type can be accurately determined irrespective of the angle of the image capture device and others.

Figure 1:
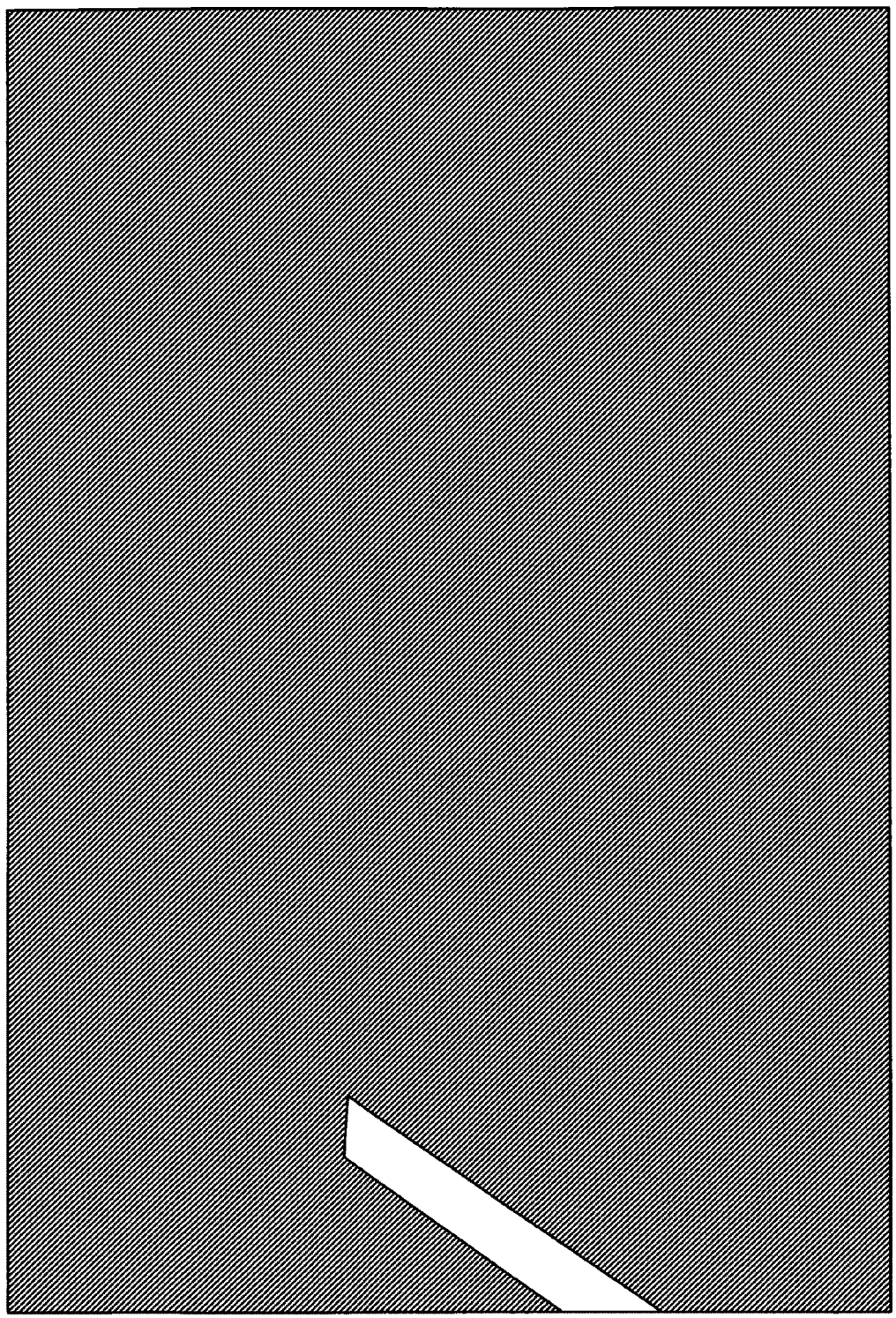
FIG. 1 is a diagram of one example of a background image.
Figure 2:
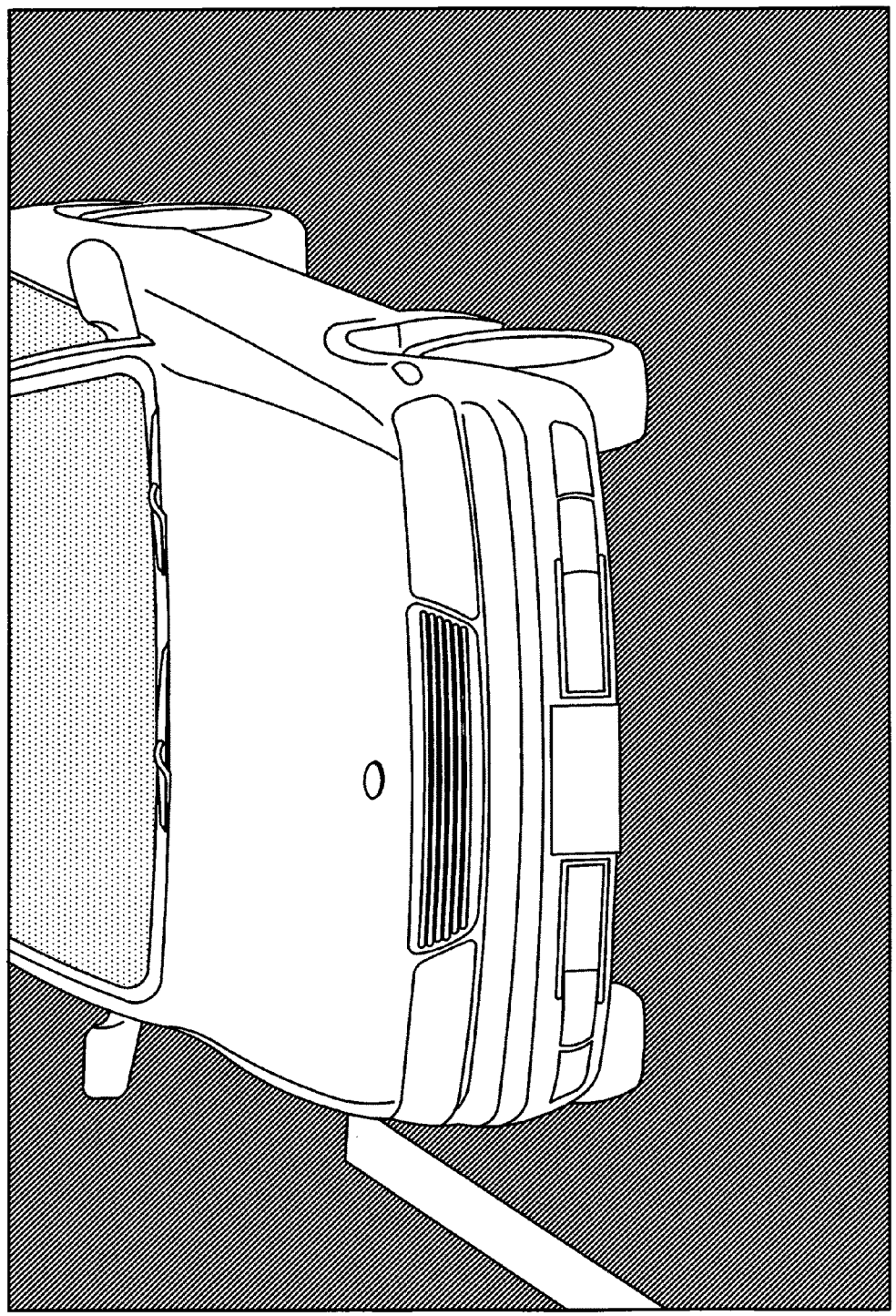
FIG. 2 is a diagram of one example of a recognized image.

In the vehicle-type determination method of the embodiment, to extract the vehicle portion of the recognition object from the recognized image, a background image and the recognized image are compared with each other. FIG. 1 is a diagram of one example of the background image. FIG. 2 is a diagram of one example of the recognized image. As depicted in FIGS. 1 and 2, the background image and the recognized image are images captured by the same image capture device at the same position and the same angle. The background image is an image in which no vehicle is printed, while the recognized image is an image in which the entire or part of a vehicle as a recognition object is printed.

Figure 3:
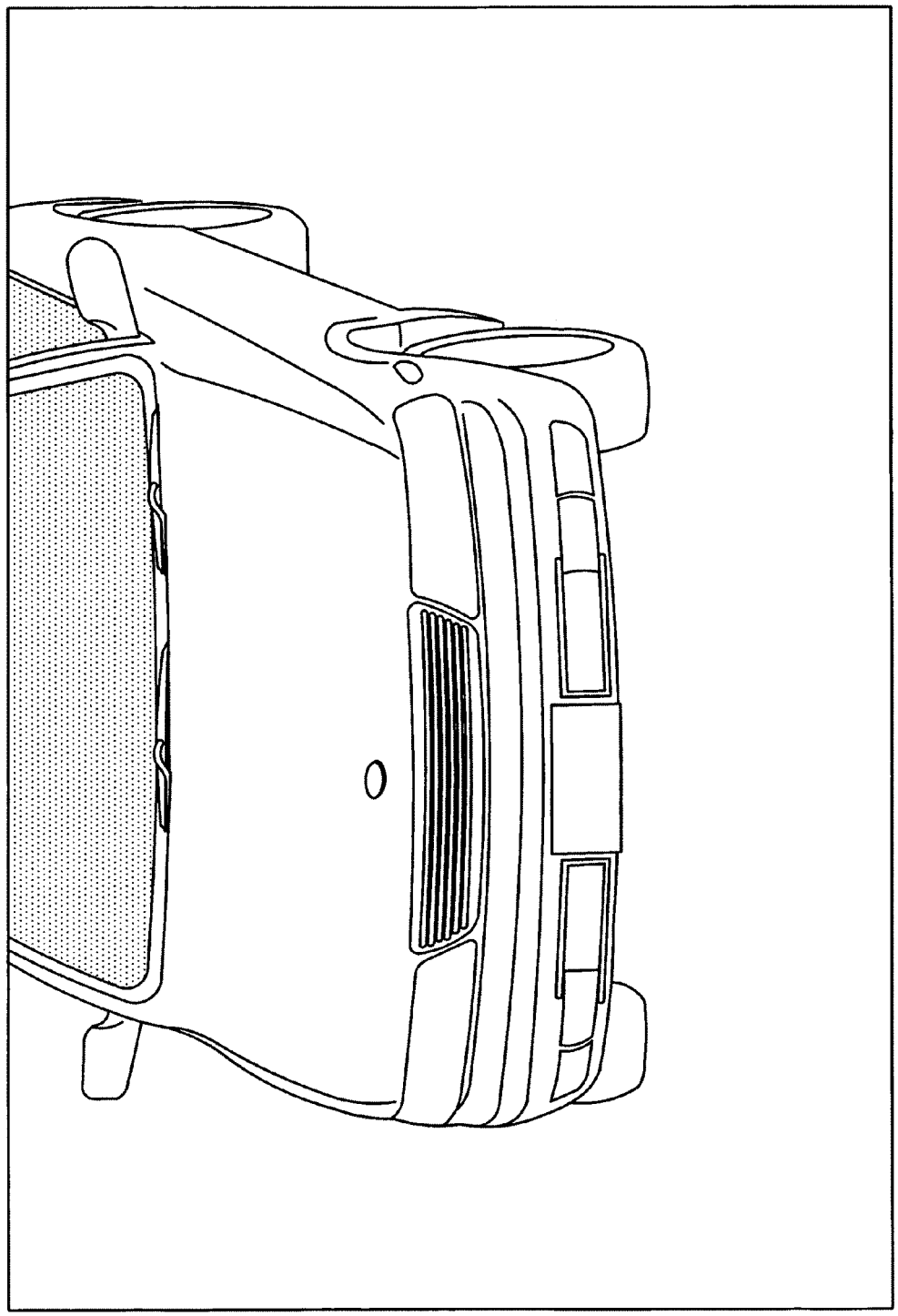
FIG. 3 is a diagram of one example of a result of extracting a vehicle portion.

By comparing these two images to generate a differential image, as depicted in FIG. 3, only the vehicle portion is extracted from the recognized image. After extraction of the vehicle portion is completed, to identify the hood, the extracted vehicle portion is divided into several areas.

Figure 4:
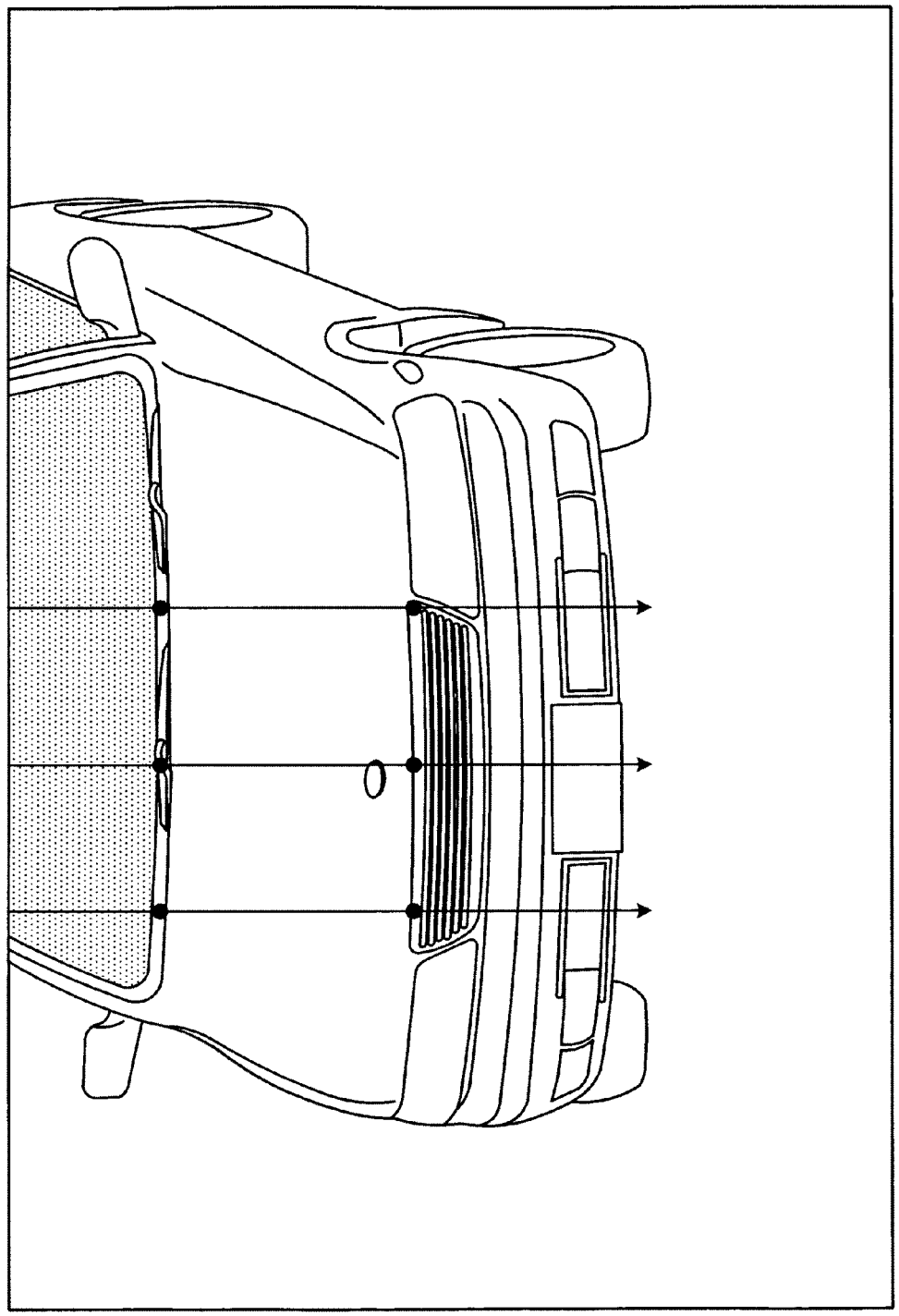
FIG. 4 is a diagram for explaining an example of detection of edges in a vertical direction.
Figure 5:
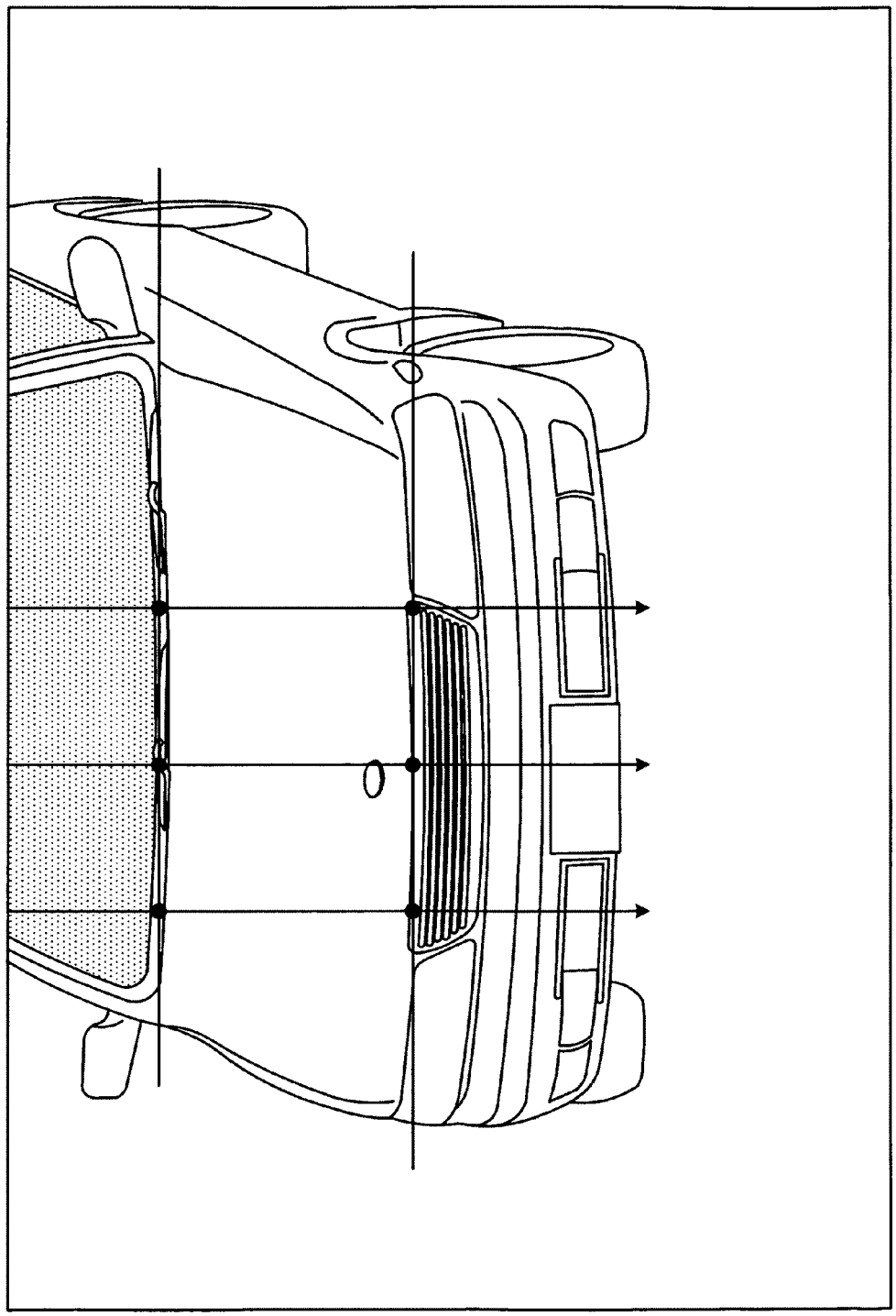
FIG. 5 is a diagram of an example of setting of boundaries based on the edges.

The vehicle portion is divided into areas with reference to edges detected by scanning several points including the center of the vehicle portion in a vertical direction. FIG. 4 is a diagram for explaining an example of detection of edges in the vertical direction. FIG. 4 depicts the example in which edges are detected by scanning three points including the center of the vehicle portion in the vertical direction. FIG. 5 is a diagram of an example of setting of boundaries based on the edges. FIG. 5 depicts the example in which straight lines each passing through the center of the edge approximately on the same horizontal line are obtained by the least-square method or the like, and are taken as boundaries.

Note that, in this example, a front-grille area and edges thereunder are disregarded. Although the front-grille area can be identified by detecting many edges, it is normally located under a hood. In the vehicle-type determination method of the embodiment, a logic of identifying the hood portion by comparison with its upper area is used, and areas under the hood are not required. For this reason, the front-grille area and the edges thereunder are not used. When the logic of identifying the hood portion is changed, the front-grille area and the edges thereunder can be used.

Figure 6:
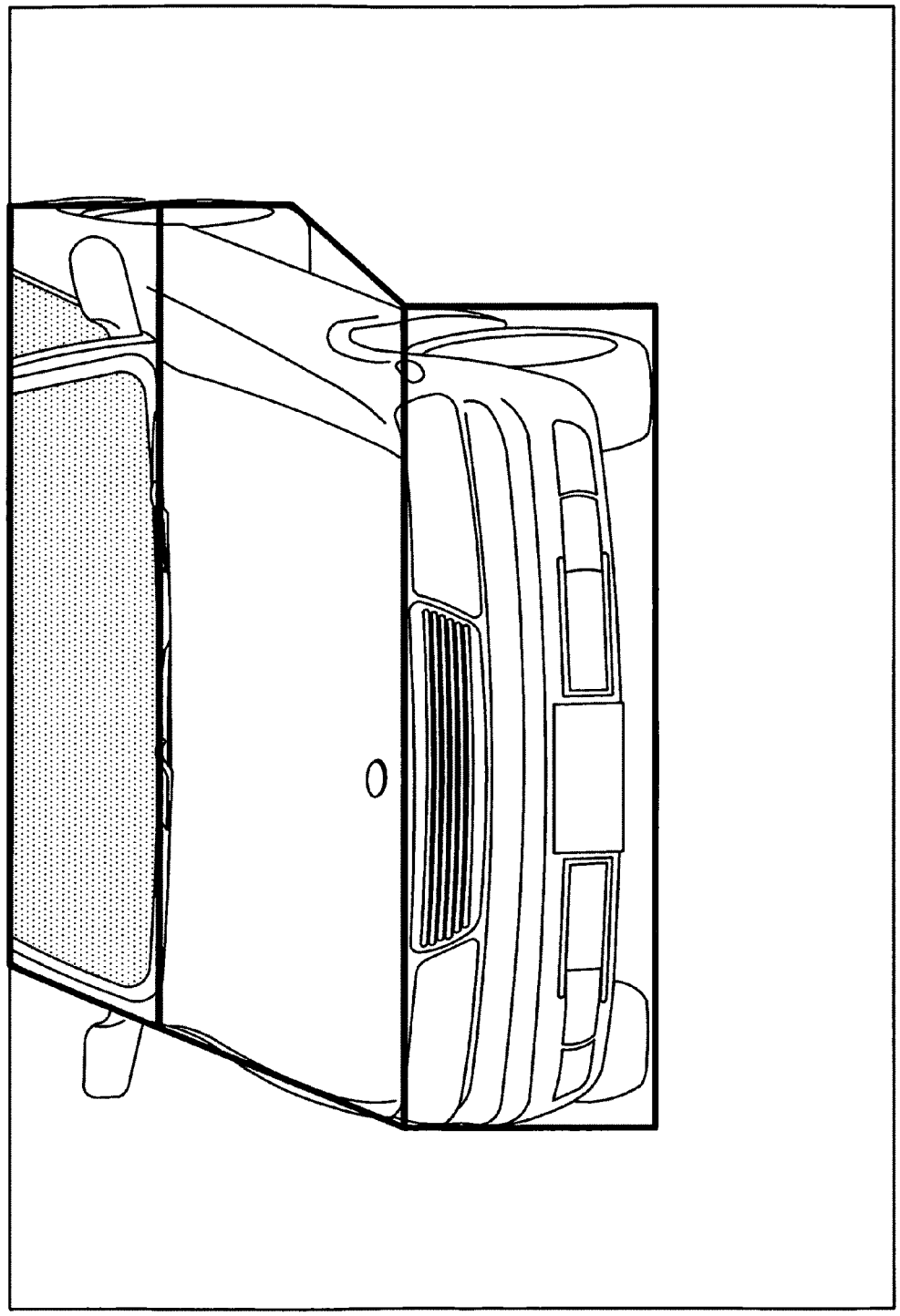
FIG. 6 is a diagram of an example of areas obtained by dividing the vehicle portion.

FIG. 6 is a diagram of an example of areas obtained by dividing the vehicle portion. FIG. 6 depicts the example in which the vehicle portion is divided into three areas based on the boundaries set in FIG. 5. In this manner, after area division, a color-change pattern and a length-change pattern in a vertical direction of each area are examined from the uppermost area, and the examination result is checked according to a predetermined estimation rule, thereby estimating an area corresponding to a hood.

Figure 7:
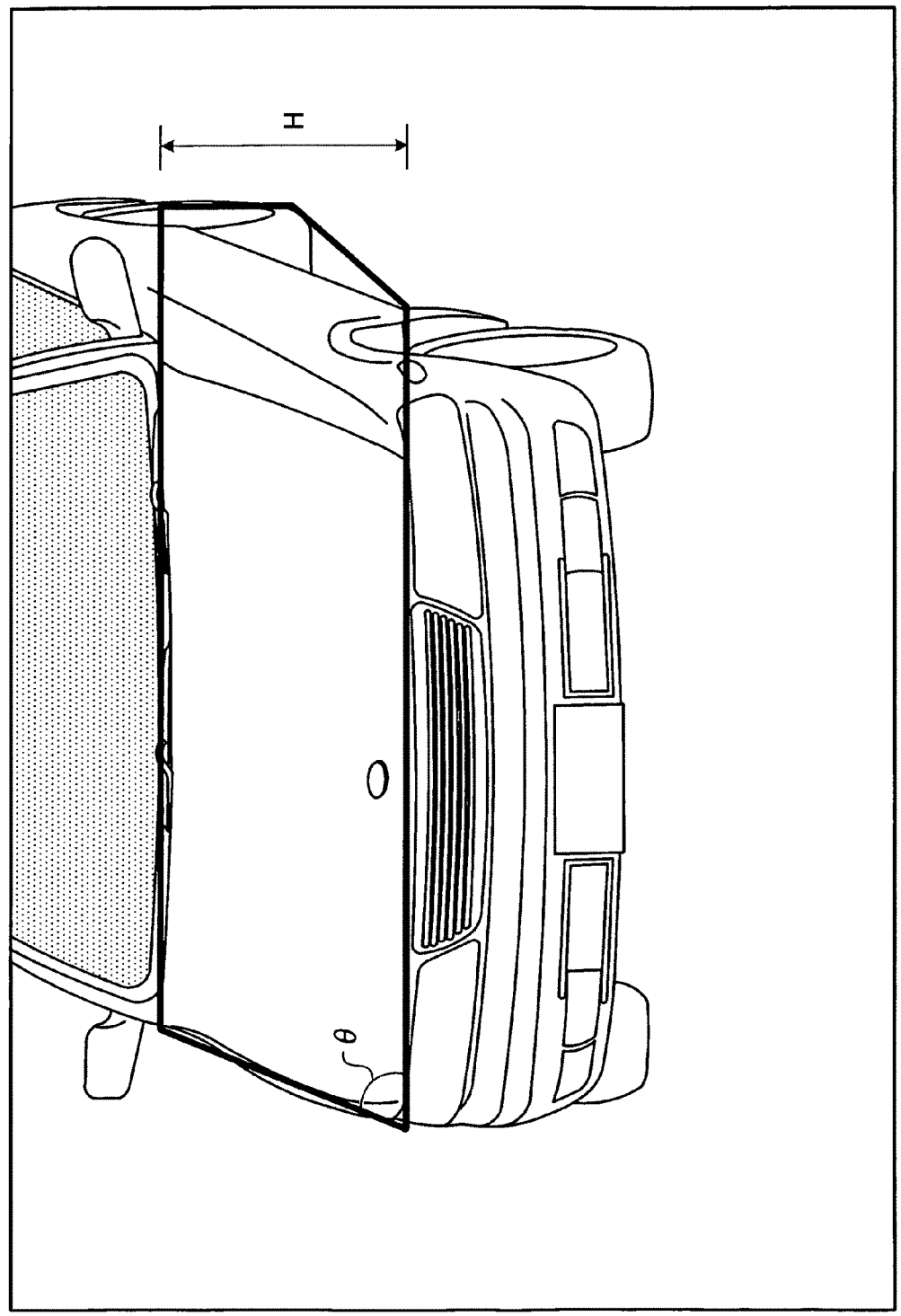
FIG. 7 is a diagram for explaining an example of how to obtain the inclination and height of a hood.

Then, after an area corresponding to a hood is estimated, the inclination and height of the hood are obtained, and these are compared with predetermined thresholds, thereby determining the type of the vehicle. FIG. 7 is a diagram of for explaining an example of how to obtain the inclination and height of the hood. As depicted in FIG. 7, an inclination $\theta$ of the hood is obtained as an angle between the lower boundary of the area and the contour line of a side thereof farther from the image capture device. A height H of the hood is obtained as a distance between the upper boundary and the lower boundary of the area. Strictly speaking, $\theta$ is not the inclination of the hood itself, but is an angle determined by the inclination of the hood and the image capture position of a camera; however, since the image capture position of the camera is constant, $\theta$ herein denotes an inclination of the hood.

To find the inclination $\theta$ of the hood, the contour line of the side farther from the image capture device is required. This line can be obtained by obtaining, in the side of the area corresponding to the hood farther from the image capture device, several points on the boundary of the area extracted as the vehicle portion and, taking straight lines each passing through the center of each of these points by the least-square method. When the vehicle portion is not accurately extracted, several points of edge in a horizontal direction are detected and, with reference to these, the contour line can be obtained.

Figure 8:
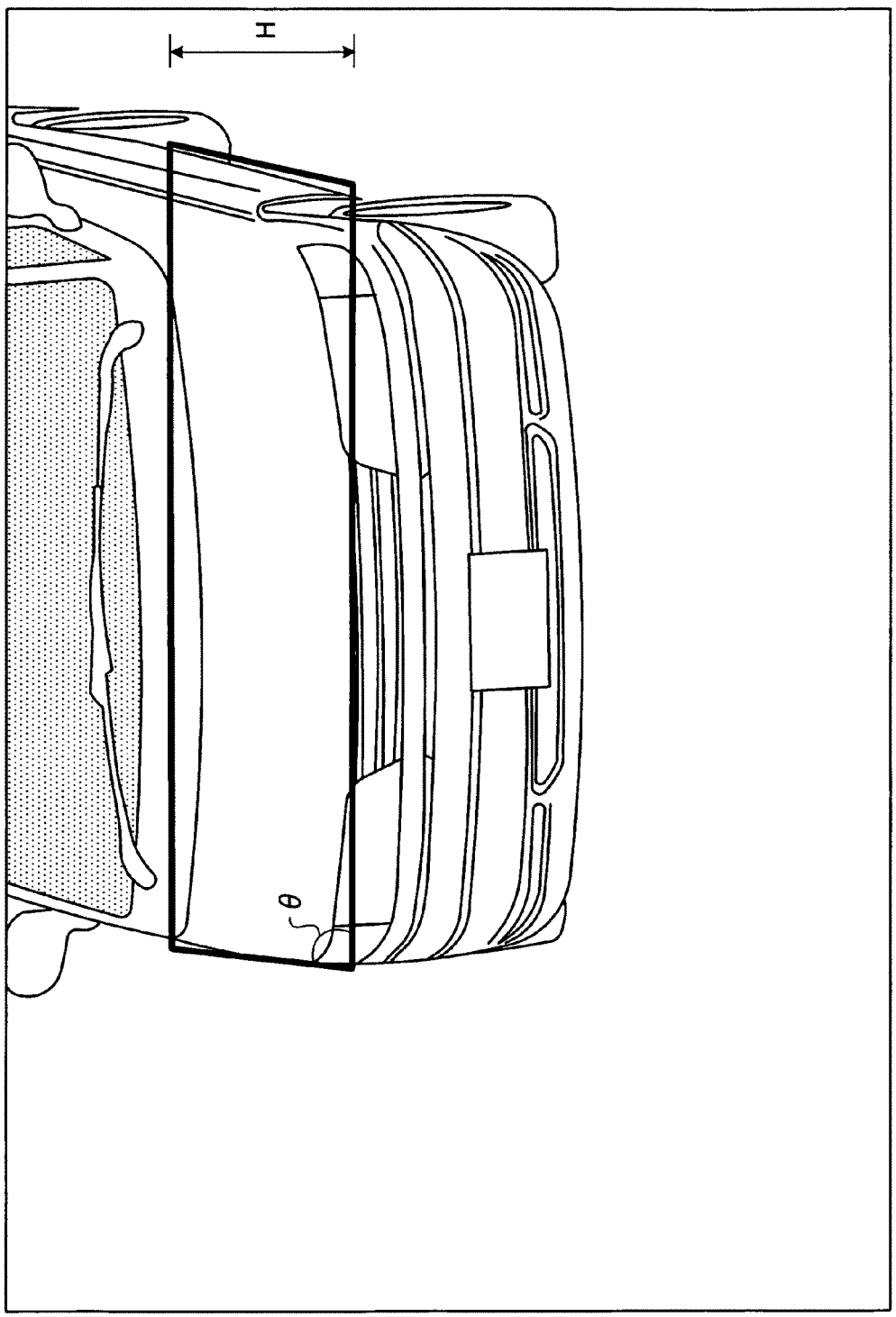
FIG. 8 is a diagram for explaining an example of how to obtain the inclination and height of the hood of a van.

FIG. 8 is a diagram for explaining an example of how to obtain the inclination and height of the hood of a van. The inclination of the hood of a van is larger than that of a standard-sized vehicle depicted in FIG. 7. The height of the hood of a van is lower than that of the standard-sized vehicle depicted in FIG. 7.

That is, the inclination and height of the van are obtain and these are compared with predetermined thresholds, thereby easily determining whether the recognition object is a standard-sized vehicle or a van. If the height of the hood of a standard-sized vehicle is printed as being equivalent to that of a van due to the angle of the image capture device, the inclination of the hood is not printed as being equivalent to that of a van, thereby avoiding an erroneous determination.

The image of the vehicle depicted in FIG. 2, for example, is captured diagonally from above. With such a technique of capturing images of a vehicle diagonally from above, drivers do not notice the camera. To facilitate a vehicle-type determination based on the license plate, the image depicted in FIG. 2, for example, is not of the entire vehicle but of the zoom-up front portion of the vehicle. In the vehicle-type determination method of the embodiment, even a partial image diagonally captured in the manner as explained above allows an accurate vehicle-type determination as long as only a difference in the degree of inclination of the hood can be identified.

Figure 9:
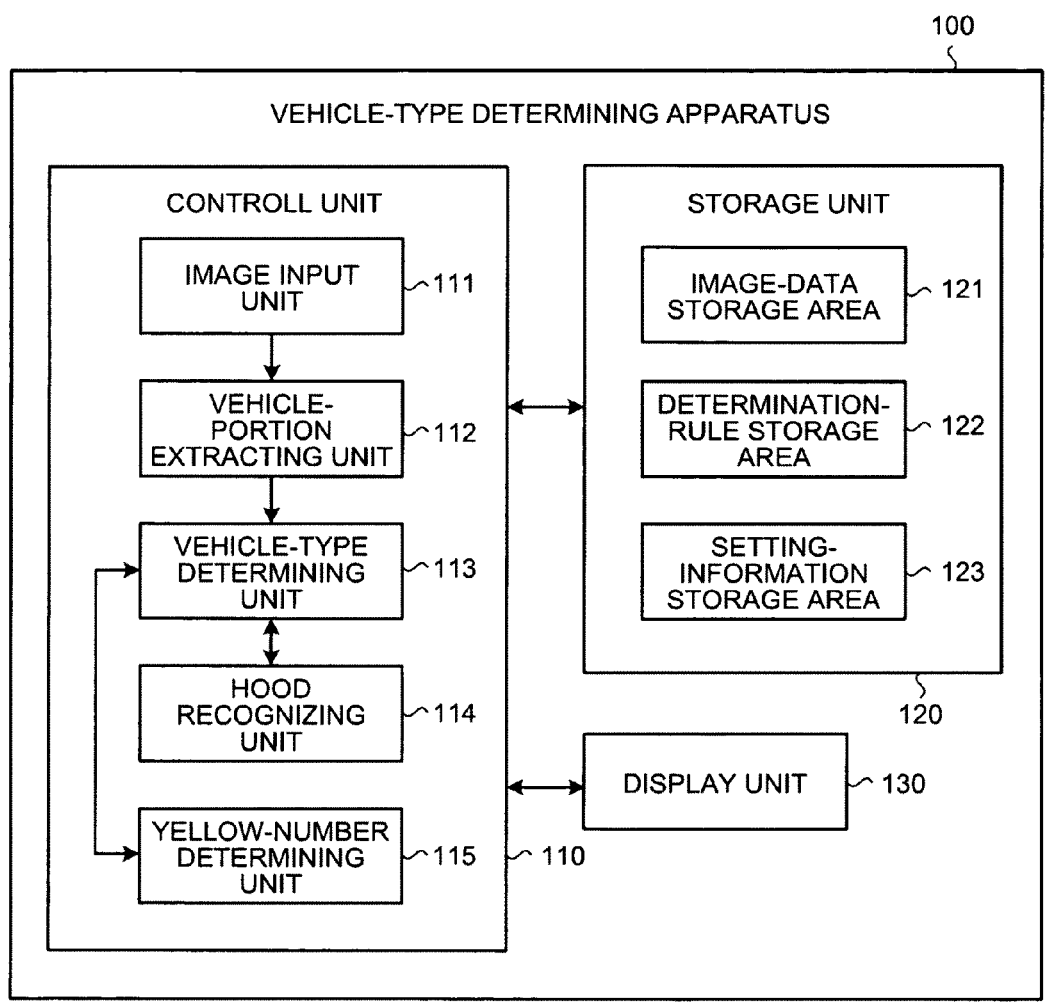
FIG. 9 is a functional block diagram of a configuration of a vehicle-type determination apparatus according to an embodiment.

Described below is a configuration of the vehicle-type determination apparatus that determines a vehicle type by using the vehicle-type determination method of the embodiment. FIG. 9 is a functional block diagram of a configuration of a vehicle-type determination apparatus according to the embodiment. As depicted in FIG. 9, a vehicle-type determination apparatus 100 includes a control unit 110, a storage unit 120, and a display unit 130. The display unit 130 is a device for displaying various types of information, and is formed of a liquid-crystal display device or the like.

The control unit 110 is a control unit that controls the entirety of the vehicle-type determination apparatus 100, and includes an image input unit 111, a vehicle-portion extracting unit 112, a vehicle-type determining unit 113, a hood recognizing unit 114, and a yellow-number determining unit 115. The image input unit 111 receives inputs of a recognized image and a background image and stores the input recognized image and background image in an image-data storage area 121 of the storage unit 120.

The vehicle-portion extracting unit 112 compares the recognized image and background image stored in the image-data storage area 121 and extracts from the recognized image a vehicle portion as a differential image. In comparing the recognized image and the background image, the vehicle-portion extracting unit 112 obtains Red, Green, and Blue (RGB) values of pixels near several points in the recognized image which may probably correspond to an image of a road surface, and compares them with RGB values of pixels near the same positions in the background image.

Then, a point with a large difference is excluded because it may probably correspond to an image of a vehicle, and an average value of the differences at the other points estimated as a road surface is obtained. Then, by using the average value of the differences, stretching of the background image is performed so that its brightness matches that of the recognized image. In this manner, the brightness of the background image is adjusted prior to difference extraction, thereby increasing the accuracy of extracting the vehicle portion.

Subsequently, the vehicle-portion extracting unit 112 compares the recognized image and the background image by fragmented area or by pixel to find an absolute value of a difference in each of the R, G, and B values. Then, a portion with an absolute value of the difference in any of the R, G, and B values being equal to or larger than a threshold is recognized as a vehicle portion.

In this manner, by comparing the recognized image and the background image to extract a vehicle portion, even if there is a portion, such as a white line on a road surface, that is different from other portions in hue or the like, such a portion is deleted, thereby accurately extracting the vehicle portion. In the above description, while the recognized image and the background image are compared with reference to the RGB values, other values, such as intensity and luminance, may be used for comparison in place of or together with the RGB values.

Although the vehicle portion is described above as being extracted by comparison with the background image, it may be extracted by any other known method, such as by extracting a contour in the recognized image by using a differential filter or the like and performing pattern-matching on the extracted contour.

The vehicle-type determining unit 113 analyzes the vehicle portion extracted by the vehicle-portion extracting unit 112 to roughly determine the type of the vehicle. Specifically, the vehicle-type determining unit 113 classifies the extracted vehicle portion as any of six types: "motorbike", "road surface or others" "light vehicle", "large-sized vehicle (truck)", "van", and "standard-sized vehicle". In Japan, a small-sized vehicle with an engine of 600 cc or smaller is classified as a "light vehicle". A "standard-sized vehicle" with an engine of 1000 cc to 3000 cc is provided with a white license plate, a "light vehicle" is provided with a yellow license plate.

When the area and width of the extracted vehicle portion are equal to or smaller than predetermined thresholds, the vehicle-type determining unit 113 determines the object as a "motorbike" if the height is larger than a threshold, and determines the object as a "road surface or others" if the height is equal to or smaller than the threshold. As a result of analysis of the yellow-number determining unit 115, if a yellow license plate is printed in the extracted vehicle portion, the object is determined as a "light vehicle".

When the area and width of the extracted vehicle portion are equal or larger than the predetermined thresholds, the vehicle-type determining unit 113 determines the object as a "large-sized vehicle". In other cases, it is determined by the vehicle-type determination method of the embodiment whether the object is a "van" or "standard-sized vehicle" based on the inclination and height of the hood.

The classification for vehicle-type determination and the determination logic are described above by way of example only, and can be changed according to the purpose. For example, if "light vehicle" is required to be further classified into "light passenger vehicle" and "light truck", discrimination between them can be made by the vehicle-type determination method of the embodiment. Specifically, when a yellow license plate is recognized, if the degree of inclination of the hood is equal to or larger than a predetermined threshold and the height of the hood is equal to or smaller than a predetermined threshold, the object is determined as a "light truck". Otherwise, the object is determined as a "light passenger vehicle".

Furthermore, the vehicle-type determination method of the embodiment can also be used for discrimination of a "large-sized vehicle". Specifically, when the hood has an inclination close to vertical and the height is equal to or larger than a predetermined threshold, the object can be determined as a "large-sized vehicle". FIG. 10 is an example of a vehicle-type determination rule for discrimination among "standard-sized vehicle", "van", and "large-sized vehicle" based on the inclination of the hood. The determination rule of FIG. 10 is stored in a determination-rule storage area 122 of the storage unit 120. The vehicle-type determining unit 113 refers to the rule, and determines the object as a "standard-sized vehicle" when the inclination θ of the hood is 45 degrees to 75 degrees, determines the object as a "van" when θ is 75 degrees to 85 degrees, and determines the object as a "large-sized vehicle" when θ is 85 degrees to 105 degrees.

The hood recognizing unit 114 identifies from the vehicle portion extracted by the vehicle-portion extracting unit 112 a portion corresponding to a hood and obtains the height and inclination of that portion. The inclination and height of the hood obtained by the hood recognizing unit 114 is used for vehicle-type determination by the vehicle-type determining unit 113.

The hood recognizing unit 114 first performs a contour extracting process on the image from which the vehicle portion is extracted by the vehicle-portion extracting unit 112. Specifically, RGB values of pixels of copied image data are subjected to Hue, Saturation, Intensity (HSI) conversion or Hue, Saturation, Value (HSV) conversion, and a gray-scale image is generated with the obtained intensity or luminance of each pixel being taken as a pixel value of the relevant pixel. Then, after the generated gray-scale image is subjected to a known differential filter, such as Sobel or Prewitt, to enhance the contour, binarization with a threshold process or the like is performed to generate a contour image.

Figure 11:
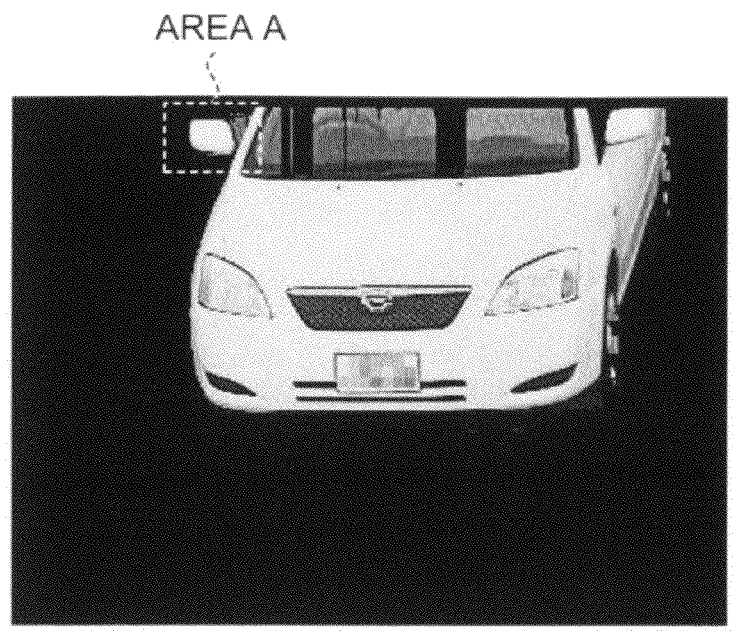
FIG. 11 is a diagram of one example of an image from which the vehicle portion is extracted by a vehicle-portion extracting unit.
Figure 12:
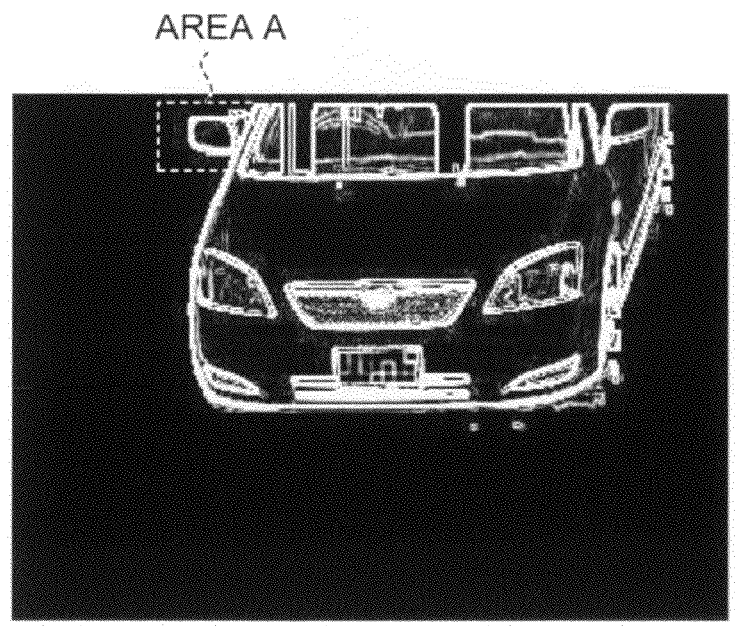
FIG. 12 is a diagram of one example of a contour image generated by a hood recognizing unit based on the image in FIG. 11.

FIG. 11 is a diagram of one example of an image from which the vehicle portion is extracted by the vehicle-portion extracting unit 112. FIG. 12 is a diagram of one example of the contour image generated by the hood recognizing unit 114 based on the image in FIG. 11. FIG. 13 is a table of pixel values of pixels forming an area A in FIG. 11. FIG. 14 is a table of pixel values of pixels forming the area A in FIG. 12. In the example of FIG. 14, binarization is performed so that pixels of the contour portion have a pixel value of 255 and pixels of other portions have a pixel value of 0.

Figure 15:
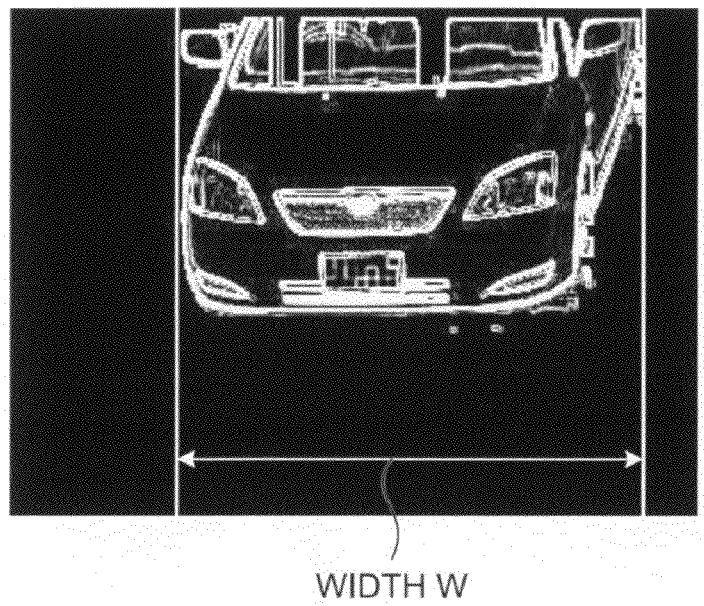
FIG. 15 is a diagram of a range of a width W of an area where a vehicle is present.

Subsequently, the hood recognizing unit 114 scans the contour image in a lateral direction to obtain leftmost coordinates and rightmost coordinates where a pixel corresponding to the contour appears, assumes a portion therebetween as an area where a vehicle is present, and obtains its width W. When the contour image is the image depicted in FIG. 12, the width W of the area where a vehicle is present represents a range depicted in FIG. 15.

Figure 16:
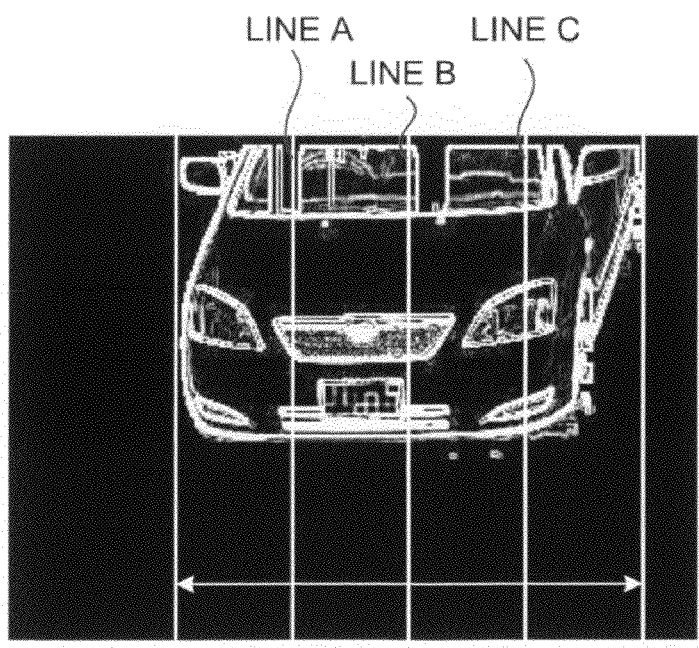
FIG. 16 is a diagram of one example of divisional lines when M=4.

Then, the hood recognizing unit 114 sets M−1 division lines in a vertical direction that divides the area where a vehicle is present so that the area has a width of W/M. M is required to be an integer at least 3 or larger, and it is assumed in the embodiment that M=4. In the case of M=4, as depicted in FIG. 16, three division lines in the vertical direction represented by lines A to C are set.

Figures 17, 18:
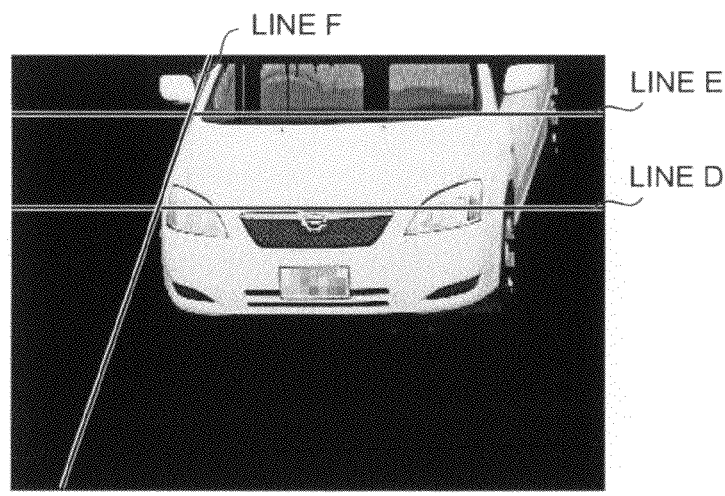
FIG. 17 is a diagram of one example of edge information.
FIG. 18 is a diagram for explaining the inclination of a hood.

After setting the division lines, the hood recognizing unit 114 scans the pixels on each division line from up to down directions while taking a difference between pixel values of adjacent upper and lower pixels. Then, every time a portion with a difference being larger than a threshold is detected, the coordinates of the upper pixel are recorded as an edge in edge information. The edge information is edge, that is, information that holds coordinates of pixels positioned on a boundary of the contour for each division line, and is stored in the image-data storage area 121 of the storage unit 120 in association with the image to be processed. One example of the edge information is depicted in FIG. 17. As depicted in FIG. 17, in the edge information, coordinates of pixels positioned on a boundary of the contour are recorded for each division line. Note that, since each division line passes a different portion of the vehicle, the number of coordinates recorded in the edge information may vary for each division line.

Subsequently, the hood recognizing unit 114 refers to the edge information to extract a combination of coordinates approximately horizontally positioned. Extracting a combination of coordinates is performed by, for example, selecting, one by one from the coordinates on each division line, coordinates with a difference between values on a Y axis falling within predetermined values. When coordinates with a difference between values on the Y axis falling within 10 are to be selected, from the example of the edge information depicted in FIG. 17, a combination of (146, 12) of the line A, (190, 17) of the line B, and (216, 16) of the line C and a combination of (146, 36) of the line A, (190, 37) of the line B, and (216, 35) of the line C are extracted, for example.

Then, the hood recognizing unit 114 uses a least square scheme or the like for each extracted combination to find straight lines in the horizontal direction each passing through the center of the coordinates in the combination and, with these straight lines being taken as boundaries, divides the image from which the vehicle portion is extracted by the vehicle-portion extracting unit 112 into areas. Through the process explained above, the vehicle portion extracted by the vehicle-portion extracting unit 112 can be divided into areas for each part of the vehicle as depicted in FIG. 6.

After the vehicle portion is divided into areas in this manner, the hood recognizing unit 114 estimates which of these areas corresponds to a hood. To assume an area corresponding to a hood, the hood recognizing unit 114 finds a color, width, and height of each area. The color may be obtained from the average of colors of the pixels in the area, or may be obtained based on color distribution of the pixels in the area. Then, the hood recognizing unit 114 checks the color, width, and height of each area according to an estimation rule stored in the determination-rule storage area 122 of the storage unit 120 to estimate an area corresponding to a hood.

FIG. 20 is a diagram of one example of the hood-area estimation rule by color. As depicted in FIG. 20, this rule defines, for each combination of colors of two adjacent upper and lower areas, a degree of accuracy with which the lower area corresponds to a hood.

For example, when the color of the upper area is "silver" and the color of the lower area is "white", there is a high possibility that the upper area is a windshield and the lower area is a hood, and therefore the degree of accuracy for this combination is "30". When the color of the upper area is "white" and the color of the lower area is "silver", there is a high possibility that the upper area is a roof and the lower area is a windshield, and therefore the degree of accuracy for this combination is "0".

FIG. 21 is a diagram of one example of the hood-area estimation rule by height of each area. As depicted in FIG. 21, this rule defines, for each combination of, in two adjacent upper and lower areas, a ratio of the height of the upper area to the entirety and a ratio of the height of the lower area to the entirety, a degree of accuracy with which the lower area corresponds to a hood.

For example, when the ratio of the height of the upper area is "25%" and the ratio of the height of the lower area is "40%", there is a high possibility that the upper area is a windshield and the lower area is a hood, and therefore the degree of accuracy for this combination is "40". When the ratio of the height of the upper area is "30%" and the ratio of the height of the lower area is "20%", there is a high possibility that the upper area is a roof and the lower area is a windshield, and therefore the degree of accuracy for this combination is "0".

The hood recognizing unit 114 checks all combinations in two adjacent areas according to these rules, and sums, for each combination, values each representing the degree of accuracy with which the lower area is a hood. For example, when the color of the upper area is "silver" and its height occupies "25%" and the color of the lower area is "white" and its height occupies "40%", a value obtained by summing the values each representing the degree of accuracy with which the lower area is a hood is 30+40, that is, 70. Then, the hood recognizing unit 114 estimates the lower area in the combination from which the highest-degree of accuracy is obtained as a hood. At this time, to prevent an area that has a narrow width and cannot be a hood from being erroneously estimated as a hood, a lower limit of the width of a hood may be stored in the determination-rule storage area 122 to make a determination while excluding a combination in which the width of the lower area is smaller than the lower limit.

In the example explained above, the area corresponding to a hood is estimated based on color- and height-change patterns in two adjacent areas. Alternatively, the area corresponding to a hood may be estimated based on color- and height-change patterns in three or more adjacent areas.

After estimating the area corresponding to a hood, the hood recognizing unit 114 finds the height and inclination of that area. The inclination is obtained as an angle formed by the base of the area corresponding to a hood, i.e., from among boundary lines obtained based on the edge information, a line representing a boundary between the area estimated as a hood and an area immediately therebelow (line D in FIG. 18), and a straight line forming a side of the area estimated as a hood farther from the camera (line F in FIG. 18).

Figure 19:
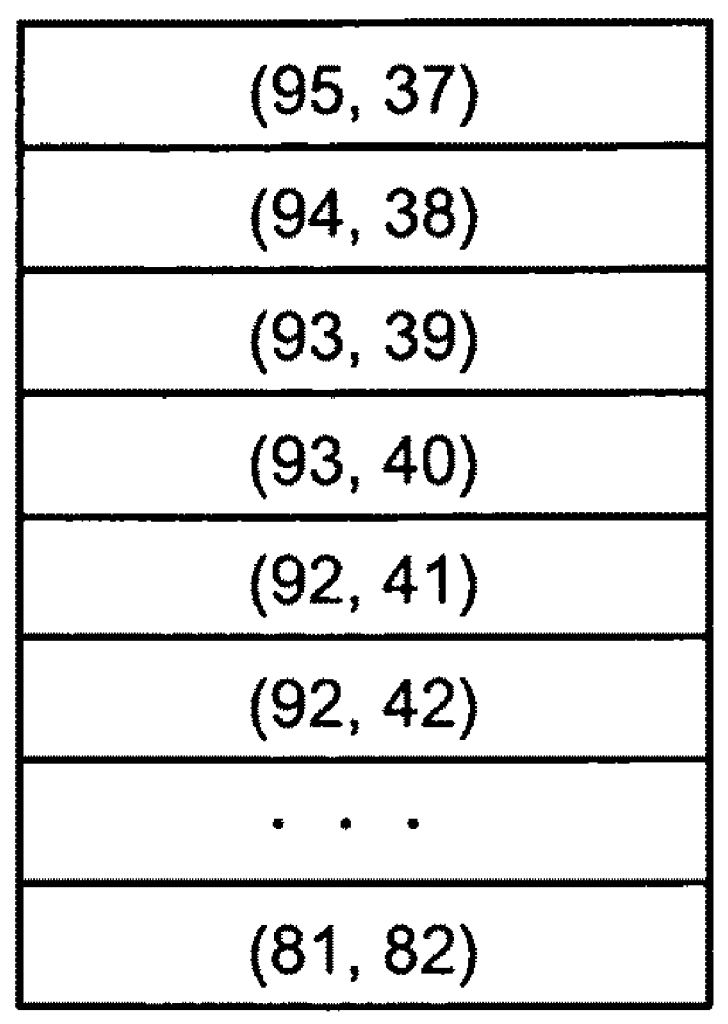

Information about which side of the area estimated as a hood is farther from the camera is stored in advance in a setting-information storage area 123 of the storage unit 120. The hood recognizing unit 114 extracts the coordinates of a boundary portion between the side farther from the camera and the background in a manner as depicted in FIG. 19, finds a straight line passing through the center of each of these coordinates by using a least square scheme or the like, and takes that straight line as a straight line of the side farther from the camera.

To prevent the inclination and height of the area corresponding to a hood from varying depending on the angle and height of the camera, the hood recognizing unit 114 may correct the inclination and height of the hood based on information about the angle of the image capture device stored in the setting-information storage area 123 of the storage unit 120 and the position of the hood portion in the entire recognized image.

The yellow-number determining unit 115 determines whether a yellow license plate is printed in the vehicle portion extracted by the vehicle-portion extracting unit 112. This determination can be achieved by using a conventional technology as disclosed in, for example, Japanese Patent Application Laid-open No. 2003-331384. The determination result of the yellow-number determining unit 115 is used for a vehicle-type determination by the vehicle-type determining unit 113.

The storage unit 120 is a storage unit that stores various types of information, and includes the image-data storage area 121, the determination-rule storage area 122, and the setting-information storage area 123. The image-data storage area 121 is an area where the recognized image whose input is received by the image input unit and its related information, and the background image are stored.

The determination-rule storage area 122 is an area where rules and thresholds for various determinations by the vehicle-type determining unit 113 and the hood recognizing unit 114 are stored. The setting-information storage area 123 is an area where setting information, such as the angle of the image capture device, is stored.

Figure 22:
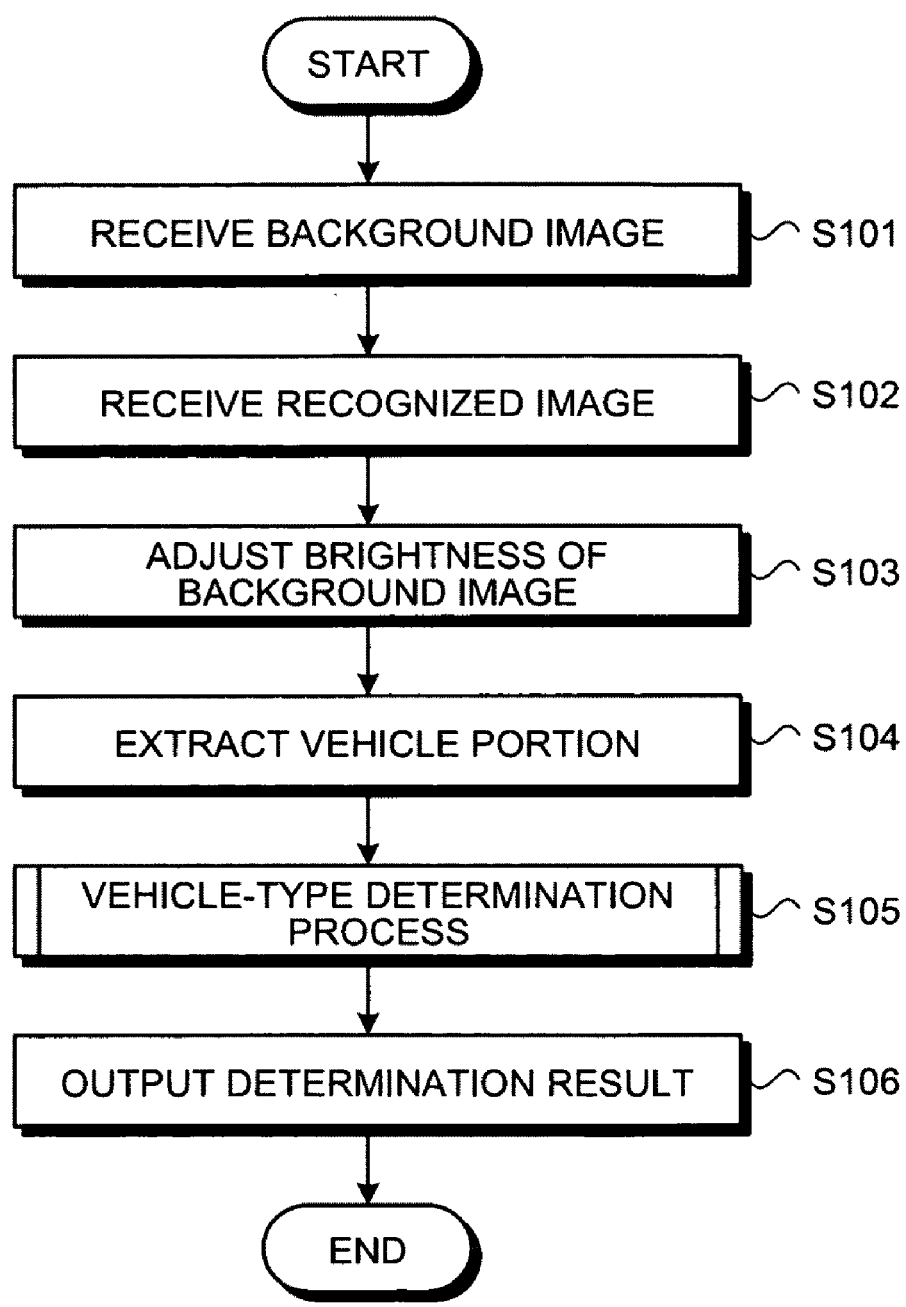
FIG. 22 is a flowchart of the operation of the vehicle-type determination apparatus.

Next, the operation of the vehicle-type determination apparatus 100 depicted in FIG. 9 is explained. FIG. 22 is a flowchart of the operation of the vehicle-type determination apparatus 100. As depicted in FIG. 22, the image input unit 111 first receives an input of a background image and stores it in the image-data storage area (step S101), and receives an input of a recognized image and stores it in the image-data storage area (step S102).

Then, the vehicle-portion extracting unit 112 adjusts the brightness of the background image so that the brightness of a road-surface portion in the recognized image and the brightness thereof in the background image are equivalent to each other (step S103) and, by comparing the recognized image and the background image, extracts a vehicle portion from the recognized image (step S104).

Then, the vehicle-type determining unit 133 performs a vehicle-type determination process, which will be explained later, on the vehicle portion extracted by the vehicle-portion extracting unit 112 to determine the type of the vehicle (step S105), and outputs the determination result to the display unit 130 (step S106).

Figure 23:
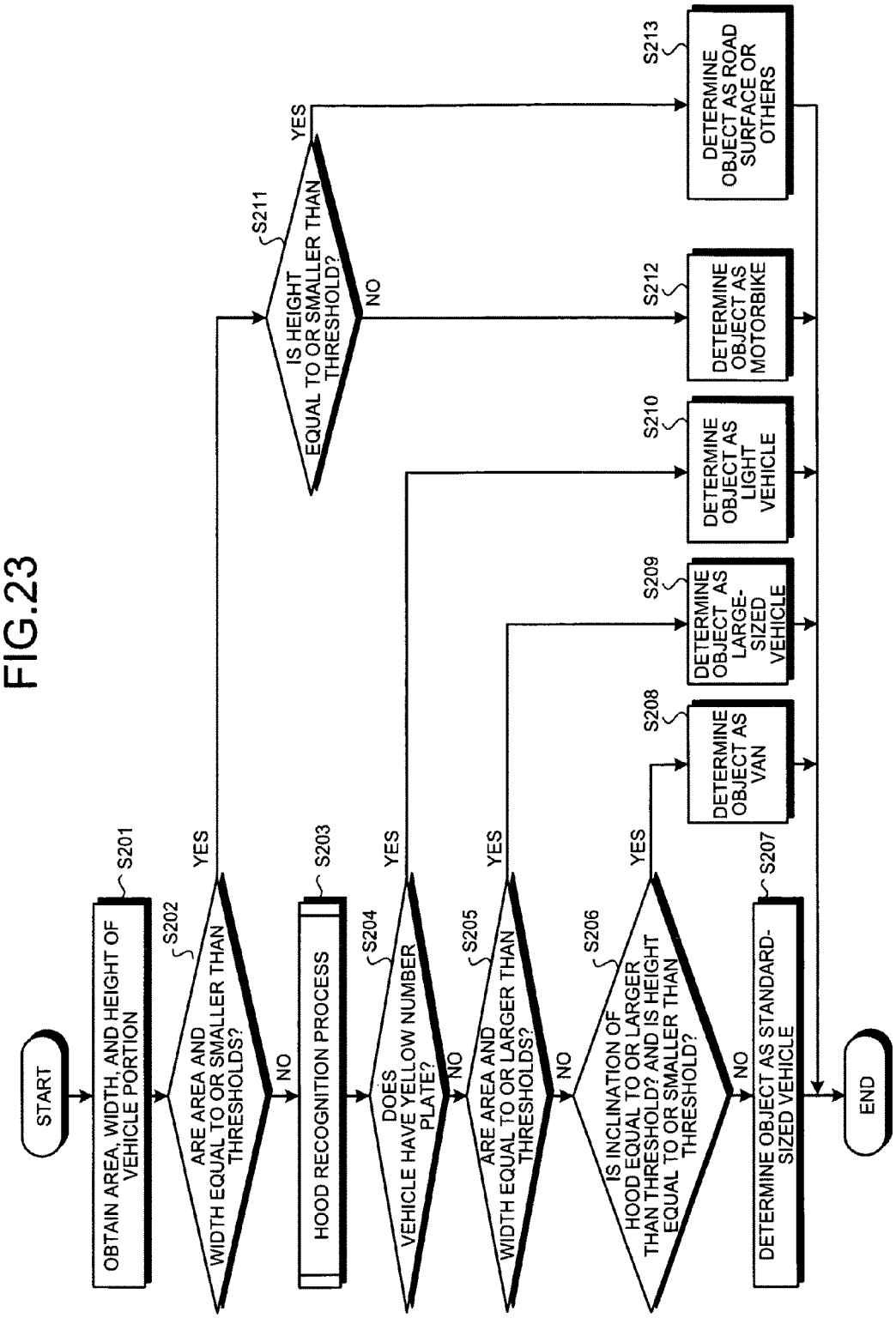
FIG. 23 is a flowchart of a vehicle-type determination process.

FIG. 23 is a flowchart of the vehicle-type determination process. As depicted in FIG. 23, the vehicle-type determining unit 113 first obtains the area, width, and height of the vehicle portion extracted by the vehicle-portion extracting unit 112 (step S201).

Then, when the area and width are equal to or smaller than thresholds (Yes at step S202) and the height is equal to or smaller than a threshold (Yes at step S211), the recognition object is determined as a "road surface or others" (step S213). Otherwise (No at step S211), the recognition object is determined as a "motorbike" (step S212).

When the area and width of the vehicle portion extracted by the vehicle-portion extracting unit 112 are not equal to or smaller than the thresholds (No at step S202), a hood recognition process, which will be explained later, is performed to obtain the inclination and height of the hood (step S203).

Then, when the yellow-number determining unit 115 recognizes the presence of a yellow license plate (Yes at step S204), the recognition object is determined as a "light vehicle" (step S210). When the area and width of the vehicle portion are equal to or larger than thresholds (Yes at step S205), the recognition object is determined as a "large-sized vehicle" (step S209).

When the recognition object is not determined as a "light vehicle" or a "large-sized vehicle" (No at step S204 and No at step S205), then the inclination of the hood obtained through the hood recognition process is equal to or larger than a threshold and the height is equal to or smaller than a threshold (Yes at step S206), and the recognition object is determined as a "van" (step S208). Otherwise (No at step S206), the recognition object is determined as a "standard-sized vehicle" (step S207).

Figure 24:
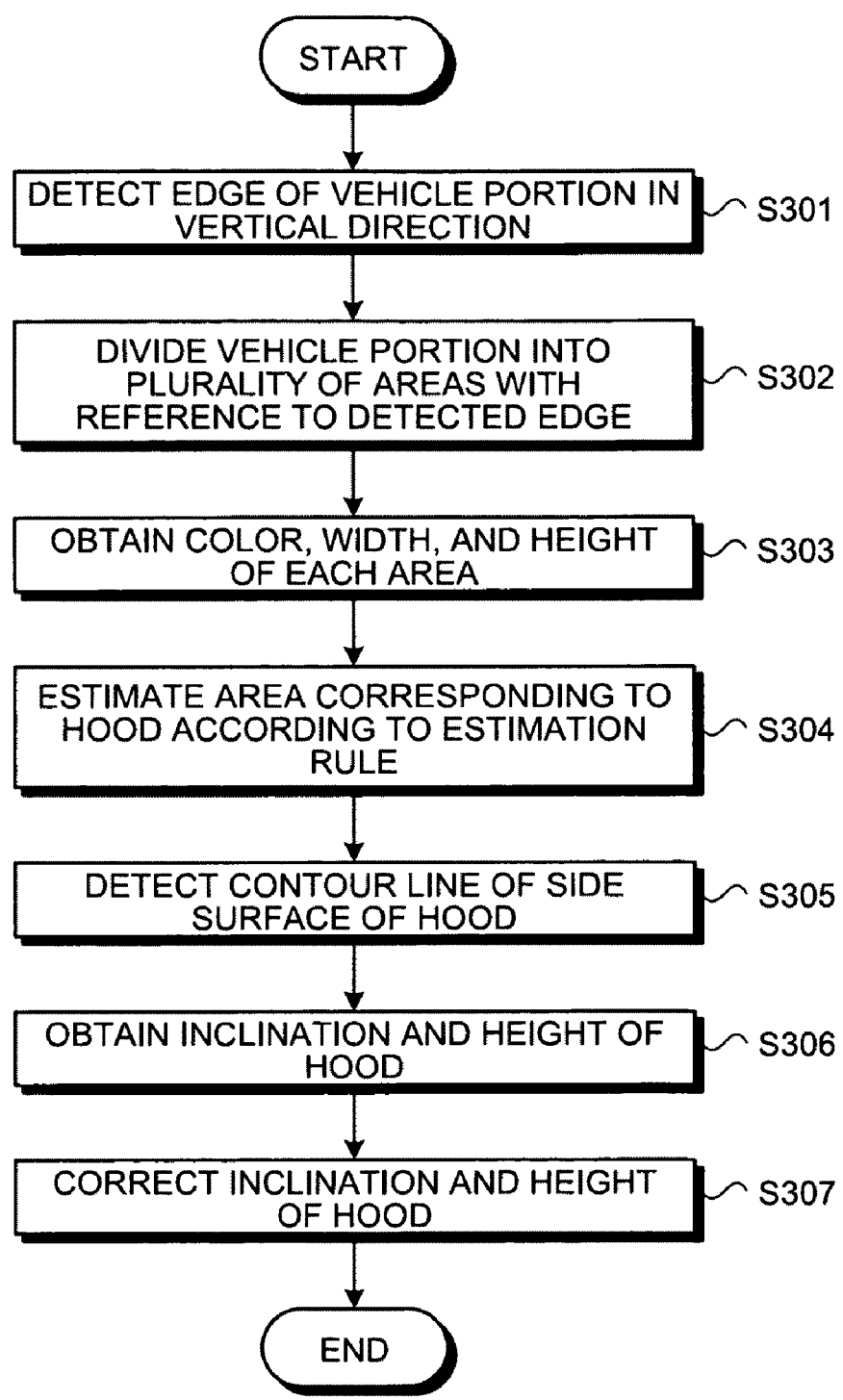
FIG. 24 is a flowchart of a hood recognition process.

FIG. 24 is a flowchart of the hood recognition process. As depicted in FIG. 24, the vehicle-type determining unit 113 first detects a vertical edge of the vehicle portion extracted by the vehicle-portion extracting unit 112 (step S301), and divides the vehicle portion into a plurality of areas with reference to the detected edge (step S302).

Then, the color, width, and height of each area of the divided vehicle portion are obtained (step S303), and these are checked according to the estimation rule to estimate the area corresponding to a hood (step S304). Then, the contour line of the side of the hood is detected (step S305), the inclination and height of the hood are obtained (step S306), and the obtained inclination and height are corrected (step S307).

The vehicle-type determination apparatus 100 of the embodiment is explained above as hardware in connection with FIG. 9; however, it can be implemented as software. In other words, a computer program (hereinafter, "vehicle-type determination program") can be executed on a computer to realize the same function as the vehicle-type determination apparatus 100. Described below is one example of a computer that executes a vehicle-type determination program 1071 implementing the functions of the control unit 110.

Figure 25:
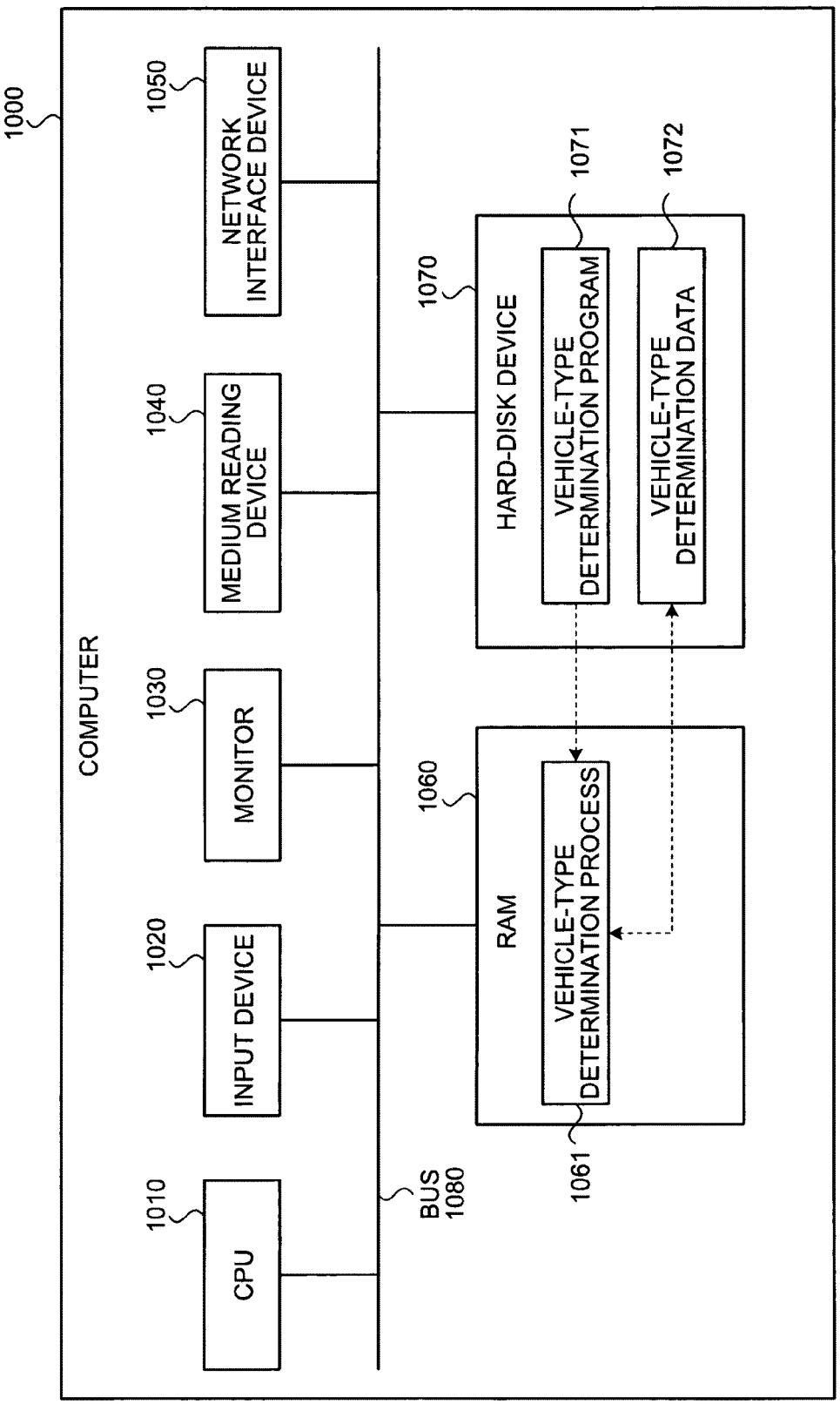
FIG. 25 is a functional block diagram of a computer that executes a vehicle-type determination program.

FIG. 25 is a functional block diagram of a computer 1000 that executes the vehicle-type determination program 1071. The computer 1000 includes a central processing unit (CPU) 1010 that performs various computing operations, an input device 1020 that receives an input of data from a user, a monitor 1030 that displays various types of information, a medium reading device 1040 that reads a program and the like from a recording medium having various programs and other recorded thereon, a network interface device 1050 that transmits and receives data with another computer via a network, a random access memory (RAM) 1060 that temporarily stores various types of information, and a hard-disk device 1070, which are connected together with a bus 1080.

The hard-disk device 1070 stores therein the vehicle-type determination program 1071 that functions similarly to the control unit 110 depicted in FIG. 9, and vehicle-type determination data 1072 corresponding to various types of data stored in the storage unit 120 depicted in FIG. 9. The vehicle-type determination data 1072 can be distributed as appropriate to be stored in another computer connected via the network.

The CPU 1010 loads the vehicle-type determination program 1071 from the hard-disk device 1070 into the RAM 1060, and thus the vehicle-type determination program 1071 implements a vehicle-type determination process 1061. In the vehicle-type determination process 1061, the information read from the vehicle-type determination data 1072 and others are developed as appropriate onto an assigned area on the RAM 1060 and, based on the developed data, various data processes are performed.

The vehicle-type determination program 1071 is not necessarily stored in the hard-disk drive 1070 and may be stored in the storage medium, such as a CD-ROM, and read by the computer 1000 to be executed. This program may also be stored in another computer (or a server) connected to the computer 1000 via a public line, the Internet, local area network (LAN), wide area network (WAN) or the like, and read by the computer 1000 therefrom to be executed.

As described above, in the embodiment, after the hood of a vehicle in an image is recognized, the type of the vehicle is determined based on the degree of inclination of the side in addition to the height of the hood. Therefore, the type of the vehicle can be accurately determined even when the vehicle type cannot be accurately determined based on the height of the hood or the like depending on the installation conditions of the image capture device.

The term "hood" as used in the embodiment explained above indicates a cover of an engine in front of the vehicle when the vehicle has the engine in front of the vehicle or a cover a cover of a trunk in front of the vehicle when the vehicle has the engine in rear of the vehicle.

Although the above embodiment describes an example in which the vehicle type is determined based on the degree of inclination of the side portion of the hood in a recognized image, it can also be determined based on the degree of roundness of the side portion of the hood. In this case, for example, after an approximation curve of the side portion of the hood is obtained, a coefficient indicating the degree of the roundness is calculated, and this is compared with a threshold for vehicle-type determination. This is suitably applied to the recognition of a vehicle with a special shape having a round hood.

Further, in place of or in addition to the hood in the recognized image, the degree of inclination of a part from which the degree of inclination is obtainable as an angle (for example, a windshield portion or a roof portion) can be obtained for determination of the vehicle type. For example, when the inclination of the windshield portion is larger than a threshold, the recognition object can be determined as a large-sized vehicle.

Still further, in the above embodiment, the vehicle type is described by way of example as being determined based on the angle between straight lines forming the base and the side of a vehicle-type determination area. Alternatively, the same result can be achieved by the angle between straight lines forming the top side and the side of the vehicle-type determination area.

Note that arbitrary combinations of the components and the representations, or the components applied to a method, an apparatus, a system, a computer program, a storage medium, a data structure, and others can be of an aspect of the present invention.

As set forth hereinabove, according to an embodiment of the present invention, a predetermined area (for example, a hood) of a vehicle in an image is recognized, and the type of the vehicle is determined based on the angle between straight lines forming a horizontal line and a side of the contour of the area. Therefore, the type of a vehicle can be accurately determined even if it cannot accurately be determined based on other information, such as the height of the hood.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle-type determination apparatus that determines a type of a vehicle based on an image of the vehicle captured, the vehicle-type determination apparatus comprising:
   a memory; and
   a processor coupled to the memory, wherein the processor executes a process comprising:
   extracting a vehicle portion from the image;
   recognizing an area corresponding to a hood in the vehicle portion extracted at the extracting; and
   determining the type of the vehicle based on an inclination of a side of the area recognized at the recognizing.

2. The vehicle-type determination apparatus according to claim 1, wherein the side of the area corresponds to a side farther from an image capture device that has captured the image.

3. The vehicle-type determination apparatus according to claim 1, wherein the recognizing includes dividing the vehicle portion into a plurality of areas with reference to edges obtained by scanning the image in a vertical direction and recognizing the area based on a color-change pattern of the areas.

4. The vehicle-type determination apparatus according to claim 1, wherein the recognizing includes dividing the vehicle portion into a plurality of areas with reference to edges obtained by scanning the image in a vertical direction and recognizing the area based on a height-change pattern of the areas.

5. A non-transitory computer-readable recording medium that stores therein a computer program for determining a type of a vehicle based on an image of the vehicle captured, the computer program causing a computer to execute:
   extracting a vehicle portion from the image;
   recognizing an area corresponding to a hood in the vehicle portion extracted at the extracting; and
   determining the type of the vehicle based on an inclination of a side of the area recognized at the recognizing.

6. A vehicle-type determination method for determining a type of a vehicle based on an image of the vehicle captured, the vehicle-type determination method comprising:
   extracting a vehicle portion from the image;
   recognizing an area corresponding to a hood in the vehicle portion extracted at the extracting; and
   determining, using a processor, the type of the vehicle based on an inclination of a side of the area recognized at the recognizing.

7. The vehicle-type determination apparatus according to claim 1, wherein the extracting includes comparing the image with an other image captured at same position and same angle and extracting a difference as the vehicle portion.

8. The vehicle-type determination apparatus according to claim 7, wherein the extracting includes matching brightness of the image and brightness of the other image prior to comparing the image with the other image.

* * * * *